US012620755B2

(12) United States Patent
Xu et al.

(10) Patent No.: US 12,620,755 B2
(45) Date of Patent: May 5, 2026

(54) QUICK ELECTRICAL-CONNECTING STRUCTURE FOR HIGH-VOLTAGE HIGH-FREQUENCY PULSE ENVIRONMENT

(71) Applicant: BEIJING RSLASER OPTO-ELECTRONICS TECHNOLOGY CO., LTD, Beijng (CN)

(72) Inventors: Xiangyu Xu, Beijing (CN); Shaohua Li, Beijng (CN); Zhao Yuan, Beijing (CN); Rui Jiang, Beijng (CN); Pei Cao, Beijng (CN)

(73) Assignee: BEIJING RSLASER OPTO-ELECTRONICS TECHNOLOGY CO., LTD, Beijing (CN)

( * ) Notice: Subject to any disclaimer, the term of this patent is extended or adjusted under 35 U.S.C. 154(b) by 381 days.

(21) Appl. No.: 18/383,057

(22) Filed: Oct. 24, 2023

(65) Prior Publication Data

US 2024/0055797 A1 Feb. 15, 2024

Related U.S. Application Data

(63) Continuation of application No. PCT/CN2021/112664, filed on Aug. 16, 2021.

(30) Foreign Application Priority Data

Apr. 25, 2021 (CN) ......................... 202110446217.5

(51) Int. Cl.
*H01R 13/53* (2006.01)
*H01R 13/52* (2006.01)
(Continued)

(52) U.S. Cl.
CPC ......... *H01R 13/53* (2013.01); *H01R 13/5205* (2013.01); *H01R 13/5216* (2013.01);
(Continued)

(58) Field of Classification Search
CPC H01R 13/53; H01R 13/5205; H01R 13/5216; H01R 13/5227; H01R 13/533;
(Continued)

(56) References Cited

U.S. PATENT DOCUMENTS 5,381,686 A 1/1995 Thorup
2005/0026496 A1* 2/2005 Islam .................. H01R 24/564 439/578
2015/0111420 A1* 4/2015 Zillinger .............. E21B 17/028 29/857

FOREIGN PATENT DOCUMENTS

CN 202111301 U 1/2012
CN 106207600 A 12/2016
(Continued)

*Primary Examiner* — Justin M Kratt
(74) *Attorney, Agent, or Firm* — Bayramoglu Law Offices LLC

(57) ABSTRACT

A quick electrical-connecting structure for a high-voltage high-frequency pulse environment relates to the technical field of high-voltage high-frequency electrical engineering. The quick electrical-connecting structure includes a plug, a socket, and a cable, where the cable is connected to the socket through the plug; the plug and the socket internally enclose an annular cavity surrounding the cable; and a protective fluid is filled in the annular cavity. By charging a protective fluid to the annular cavity in the plug and the socket, a high-intensity insulating fluid protective layer is maintained around a connecting position of the cable in the annular cavity. Therefore, the quick electrical-connecting structure lowers an internal humidity, and can effectively reduce corona discharge and creepage.

16 Claims, 10 Drawing Sheets

(51) Int. Cl.

| | |
|---|---|
| ***H01R 13/533*** | (2006.01) |
| ***H01R 13/6581*** | (2011.01) |
| ***H01R 24/00*** | (2011.01) |
| *H01R 13/46* | (2006.01) |
| *H01R 13/59* | (2006.01) |
| *H01R 13/639* | (2006.01) |
| *H01R 13/6591* | (2011.01) |
| *H01R 13/6592* | (2011.01) |
| *H01R 24/38* | (2011.01) |
| *H01R 24/40* | (2011.01) |

(52) U.S. Cl.

CPC ....... *H01R 13/5227* (2013.01); *H01R 13/533* (2013.01); *H01R 13/6581* (2013.01); *H01R 24/00* (2013.01); *H01R 13/46* (2013.01); *H01R 13/52* (2013.01); *H01R 13/5219* (2013.01); *H01R 13/5221* (2013.01); *H01R 13/59* (2013.01); *H01R 13/639* (2013.01); *H01R 13/6591* (2013.01); *H01R 13/6592* (2013.01); *H01R 24/38* (2013.01); *H01R 24/40* (2013.01)

(58) Field of Classification Search

CPC .... H01R 13/6581; H01R 24/00; H01R 13/46; H01R 13/52; H01R 13/5219; H01R 13/5221; H01R 13/59; H01R 13/639; H01R 13/6591; H01R 13/6592; H01R 24/38; H01R 24/40

See application file for complete search history.

(56) References Cited

FOREIGN PATENT DOCUMENTS

| | | | | | |
|---|---|---|---|---|---|
| CN | 215184810 | U | | 12/2021 | |
| DE | 3806081 | A1 | | 8/1989 | |
| DE | 202020004875 | U1 | * | 2/2021 | ............ H01R 13/53 |

* cited by examiner

QUICK ELECTRICAL-CONNECTING STRUCTURE FOR HIGH-VOLTAGE HIGH-FREQUENCY PULSE ENVIRONMENT

CROSS REFERENCE TO THE RELATED APPLICATIONS

This application is the continuation application of International Application No. PCT/CN2021/112664, filed on Aug. 16, 2021, which is based upon and claims priority to Chinese Patent Application No. 202110446217.5, filed on Apr. 25, 2021, the entire contents of which are incorporated herein by reference.

TECHNICAL FIELD

The present disclosure relates to the technical field of high-voltage high-frequency electrical engineering, and in particular to a quick electrical-connecting structure for a high-voltage high-frequency pulse environment.

BACKGROUND

To transmit high-voltage, high-frequency pulse energy between high-frequency magnetic compression pulse switching power supplies, corona discharge and creepage are caused easily at an electrical connector of a connecting device. With strong limitations in use, the common high-voltage connector cannot be adapted for a high-voltage, high-frequency pulse environment, such as a 30-kV, 6-KHz environment. If the common high-voltage connector is used, the connecting circuit and the connecting device are burned out easily, and the connecting device is prone to a fall or even damage.

SUMMARY

An objective of the present disclosure is to provide a quick electrical-connecting structure for a high-voltage high-frequency pulse environment, to solve at least one of the above problems in the prior art.

To solve the above-mentioned technical problem, the present disclosure provides a quick electrical-connecting structure for a high-voltage high-frequency pulse environment, including a plug, a socket, and a cable, where

- the cable is connected to the socket through a plug; and
- the plug and the socket internally enclose an annular cavity surrounding the cable; and a protective fluid is filled in the annular cavity.

By charging a protective fluid to the annular cavity in the plug and the socket, a high-intensity insulating fluid protective layer is maintained around a connecting position of the cable in the annular cavity. Therefore, the present disclosure lowers an internal humidity, and can effectively reduce corona discharge and creepage.

Further, the protective fluid is an inert fluid (such as argon and helium) or nitrogen; and the protective fluid may further be a protective oil.

Further, a socket core is provided in the socket; and a front end of the cable is provided with an electrical connector cooperated with the socket core by splicing.

The socket core is connected to an electrical device through a wire led out from the socket. Preferably, the socket core is made of a high-conductivity anti-corrosion material such as nickel plated copper; the electrical connector is a banana connector; the banana connector is a common elastic electrical contact structure in an electronic device; and the banana connector may be fixedly connected to the cable by welding.

Further, a pressure of the protective fluid filled in the annular cavity is greater than an external atmospheric pressure. With the protective fluid in a positive pressure state in the annular cavity, the high-intensity insulating fluid protective layer can be maintained longer around the electrical connector and the socket core, and in the annular cavity. This effectively lowers the internal humidity, and achieves a longer protective effect and a better insulating effect.

Further, an inlet for charging the protective fluid to the annular cavity is formed in the plug or the socket. Preferably, a one-way valve is provided on the inlet.

Preferably, an air admission connector is provided on the inlet.

Further, an outlet communicating with the annular cavity is formed in the socket or the plug; and an overflow valve is provided on the outlet.

With the outlet, when the protective fluid is charged, original air is exhausted to ensure a purity of the protective fluid in the annular cavity. The one-way connection element such as the overflow valve can effectively control the pressure in the annular cavity.

Further, a side of the socket adjacent to the plug is provided with an accommodation groove for accommodating a head of the cable; an inner diameter of the accommodation groove is greater than a diameter of the cable; and after the cable is inserted into the accommodation groove, the cable is not in contact with an inner sidewall of the accommodation groove.

Further, a first annular cavity is formed in the socket; the first annular cavity is sleeved outside the accommodation groove; and the socket is provided with an annular axial protrusion between the first annular cavity and the accommodation groove. The annular axial protrusion is sleeve-shaped, where the accommodation groove is formed at an inner side of the annular axial protrusion, and the first annular cavity is enclosed by an outer side of the annular axial protrusion and the socket.

Creepage is a slight discharge phenomenon on a surface of an insulator, and is particularly obvious at a docking position of a circuit. In the present disclosure, a connecting position between the electrical connector and the socket core, and a tail end of the head of the cable are most likely to cause the creepage. According to the present disclosure, the first annular cavity is formed in an outer circumference of the accommodation groove for accommodating the head of the cable, and the first annular cavity as a part of the annular cavity is filled with the protective fluid. The first annular cavity effectively prevents electrons from flowing outward like a moat, thereby limiting the creepage within a small range in the socket body.

At least the annular axial protrusion on the socket is made of an insulating material. The annular axial protrusion greatly lengthens a creepage distance, and further effectively prevents the electrons from flowing outward in combination with the first annular cavity.

Further, in an axial direction of the cable, a bottom of the first annular cavity protrudes from a bottom of the accommodation groove; and the first annular cavity completely covers the accommodation groove.

Further, the socket includes a socket head and a socket body; the socket body is connected to the plug through the socket head; the socket body is made of an insulating material such as rubber, ceramic, and polyphenylene sulfide (PPS) plastic; and the accommodation groove or the first annular cavity is formed in the socket body.

There are a variety of connection types between the socket head and the socket body that may be splicing in interference fit, threaded connection or snap-ring locking.

Further, an insertion groove for accommodating the electrical connector is formed in the bottom of the accommodation groove; and the socket core is provided in the insertion groove. More preferably, a guiding surface for guiding the electrical connector is provided at an edge of the insertion groove.

Further, the socket head is made of a conductive metal material such as brass; a radially outward-protruding annular connecting seat is provided on the socket head; and a connecting hole or a positioning hole is formed in the annular connecting seat.

Further, the socket head is connected to a ground wire.

Further, an outer circumference of an end of the socket body adjacent to the socket head is provided with an annular groove, or is provided with a plurality of annular grooves at intervals.

The annular groove can effectively prevent the creepage on an outer surface of the socket body caused by a high-voltage electric field.

Further, the plug includes a plug body; a through hole is formed in the plug body; the cable is inserted into the through hole from a second end of the plug body; the head of the cable is stretched out of the through hole from a first end of the plug body; and after the first end of the plug body is connected to the socket in a sealing manner, the head of the cable is stretched into the accommodation groove.

Further, an inner side of the through hole is smooth, without a sharp point.

Further, a sealing structure for connecting the plug body and the socket head in a sealing manner is provided between the plug body and the socket head.

Preferably, the plug further includes a fixing nut (or referred to as a fixing ferrule); an outer screw thread is provided on an outer circumference of the socket head; one end of the fixing nut is provided with an inner screw thread, and the other end of the fixing nut is provided with a radially inward-protruding annular workbench; a boss cooperated with the annular workbench is provided on the plug body; and a clamping sleeve structure for docking a tube is provided between the socket head and the fixing nut. The first end of the plug body is inserted into a middle mounting hole of the plug head, the fixing nut is screwed to the socket head, and through the annular workbench of the fixing nut, an outer end surface of the boss of the plug body is attached to an end surface of the socket head, thereby realizing the sealing connection of the plug body and the socket head. A sealing washer may also be provided between the plug body and the socket head to achieve better sealing performance.

Further, the quick electrical-connecting structure further includes a locking device for sealing and fixedly connecting the cable and the plug body; the locking device includes a cable locker and a locking sleeve; a first end of the cable locker props against the second end of the plug body, and a second end of the cable locker is provided with a plurality of elastic sheets arranged circumferentially at intervals; one end of the locking sleeve is in screw-thread fit with the plug body; a sealing structure is provided between the locking sleeve and the plug body; the other end of the locking sleeve is provided with a wedge-shaped surface; the cable passes through the cable locker and the locking sleeve and is inserted into the plug body through an through hole; and when the locking sleeve is screwed, the elastic sheets are shrunk radially through the wedge-shaped surface to clasp the cable.

Further, an anti-slip tooth or anti-slip pattern for clasping the cable is provided at an inner side of the elastic sheet.

Further, the plug body, the locking sleeve, and the cable locker are made of a conductive metal material, such as brass and stainless steel. More preferably, the cable locker is made of an elastic conductive material, such as beryllium bronze.

Further, the first end of the cable locker is provided with a ring portion; an outer conical surface is provided on the ring portion; and the second end of the plug body is provided with an inner conical surface cooperated with the outer conical surface.

Further, the quick electrical-connecting structure further includes a shielding net sleeved outside the cable; and a tail end of the shielding net (namely the end at the head of the cable) is turned up and pressed between the plug body and the cable locker. Specifically, the tail end of the shielding net is turned up and pressed between the outer conical surface and the inner conical surface.

Further, the other end of the locking sleeve is provided with a radially inward-protruding annular table; the wedge-shaped surface is provided on the annular table; and a sealing structure, such as one sealing ring or a plurality of sealing rings, is provided between the annular table and the cable.

An inner diameter of the through hole adjacent to the socket is bigger than an inner diameter of the through hole away from the socket, and an inner surface of the through hole is smooth transition.

Further, the quick electrical-connecting structure further includes a support sleeve made of an insulating material; and the support sleeve is provided in the through hole of the plug body, sleeved on the cable, and configured to prevent the cable from directly contacting the plug body.

Preferably, the support sleeve is made of a high-intensity insulating material, such as PPS, polytetrafluoroethylene (PTFE), and polyether-ether-ketone (PEEK).

Further, the support sleeve is fixedly connected to the plug body through threaded connection, splicing or clamping.

Further, the support sleeve sequentially includes a threaded portion, a frustum-shaped portion and a sleeve portion in an axial direction; a wall thickness of the frustum-shaped portion is greater than a wall thickness of the threaded portion and a wall thickness of the sleeve portion; the frustum-shaped portion is provided with an outer frustum-shaped surface; and an inner conical surface cooperated with the outer frustum-shaped surface is provided in the through hole of the plug body.

In the present disclosure, the overall support sleeve is arrow-headed. The frustum-shaped portion greatly improves a supporting capacity, and prevents a portion of the cable in the plug and the socket from directly contacting the plug and the socket in use. An outer end of the sleeve portion is flush with the first end of the plug body or protrudes from the first end of the plug body. While achieving a better support capacity, this can reserve a large second annular cavity between the sleeve portion and the plug body as much as possible, thereby improving a volume of the protective fluid. After the plug and the socket are docked, the first annular cavity communicates with the second annular cavity to form the annular cavity.

Further, an inlet is formed in the locking sleeve; and an outlet is formed in the socket body.

Further, a flow channel for allowing the protective fluid to pass through is formed in the support sleeve. Thus, the protective fluid charged from the inlet of the locking sleeve flows to the annular cavity through the flow channel.

Further, the quick electrical-connecting structure further includes an anti-bending sleeve sleeved outside the cable, so as to improve an anti-bending capacity of the cable. Preferably, the anti-bending sleeve is fixedly connected to the locking sleeve by clamping or threaded connection.

With the above technical solutions, the present disclosure has the following beneficial effects:

By charging a protective fluid to the annular cavity in the plug and the socket, a high-intensity insulating fluid protective layer is maintained around a connecting position of the cable in the annular cavity. Therefore, the quick electrical-connecting structure for a high-voltage high-frequency pulse environment provided by the present disclosure lowers an internal humidity, and can effectively reduce corona discharge and creepage.

BRIEF DESCRIPTION OF THE DRAWINGS

In order to illustrate the specific implementations of the present disclosure or the technical solutions in the prior art more clearly, the accompanying drawings that need to be used in the description of the specific implementations or the prior art will be briefly described below. Apparently, the accompanying drawings in the following description are some implementations of the present disclosure. For those of ordinary skill in the art, other drawings can also be obtained based on these drawings without creative efforts.

REFERENCE NUMERALS

Figure 1:
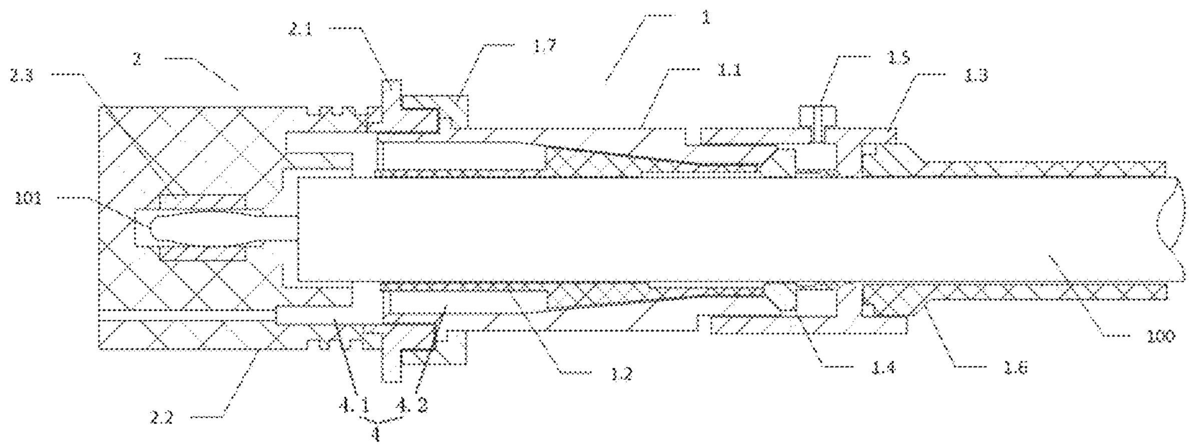
FIG. 1 is a front view of a quick electrical-connecting structure according to an embodiment of the present disclosure.

1—plug, 1.1—plug body, 1.1*a*—through hole, 1.2—support sleeve, 1.2*a*—threaded portion, 1.2*b*—frustum-shaped portion, 1.2*c*—sleeve portion, 1.2*d*—flow channel, 1.3—locking sleeve, 1.3*a*—wedge-shaped surface, 1.4—cable locker, 1.4*a*—ring portion, 1.4*b*—elastic sheet, 1.4*c*—anti-slip tooth, 1.5—air admission connector, 1.6—anti-bending sleeve, 1.7—fixing nut, 2—socket, 2.1—socket head, 2.2—socket body, 2.2*a*—annular groove, 2.3—socket core, 2.4—accommodation groove, 2.5—insertion groove, 4—annular cavity, 4.1—first annular cavity, 4.2—second annular cavity, 4.3—inlet, 4.4—outlet, 100—cable, 101—electrical connector, 102—head, and 100*a*—shielding net.

DETAILED DESCRIPTION OF THE EMBODIMENTS

The following clearly and completely describes the technical solutions of the present disclosure with reference to accompanying drawings. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

In the description of the present disclosure, it should be noted that orientations or position relationships indicated by terms "center", "top", "bottom", "left", "right", "vertical", "horizontal", "inner", "outer" and the like are based on the orientation or position relationships as shown in the drawings, for ease of describing the present disclosure and simplifying the description only, rather than indicating or implying that the indicated device or element must have a particular orientation or be constructed and operated in a particular orientation. Therefore, these terms should not be understood as a limitation to the present disclosure. Moreover, the terms "first", "second", and "third" are used only for the purpose of description, and are not intended to indicate or imply relative importance.

In the description of the present disclosure, it should be noted that, unless otherwise clearly specified, meanings of terms "mount", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two elements. Those of ordinary skill in the art may understand specific meanings of the foregoing terms in the present disclosure based on a specific situation.

The present disclosure is described in further detail below with reference to specific implementations.

As shown in FIGS. 1-10, an embodiment provides a quick electrical-connecting structure for a high-voltage high-frequency pulse environment, including plug 1, socket 2, and cable 100. The cable 100 is connected to the socket 2 through the plug 1. The plug 1 and the socket 2 internally enclose annular cavity 4 surrounding the cable 100. A protective fluid is filled in the annular cavity 4. Specifically, the annular cavity 4 is spliced by a first half cavity in the plug 1 and a second half cavity in the socket 2. The cable 100 passes through the two half cavities to form the annular cavity.

By charging a protective fluid to the annular cavity 4 in the plug 1 and the socket 2, a high-intensity insulating fluid protective layer is maintained around a connecting position of the cable 100 in the annular cavity 4. Therefore, the present disclosure lowers an internal humidity, and can effectively reduce corona discharge and creepage.

The protective fluid is preferably an inert fluid, such as argon and helium. The protective fluid may further be protective oil.

Figure 2:
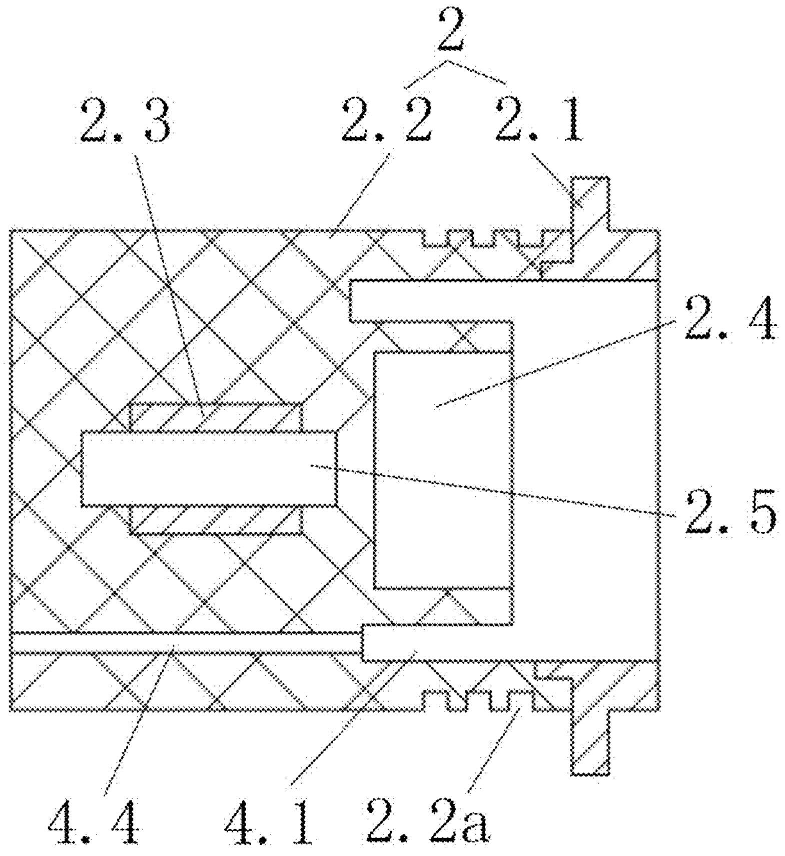
FIG. 2 is a sectional view of a socket shown in FIG. 1.

As shown in FIG. 2, socket core 2.3 is provided in the socket 2. A front end of the cable 100 is provided with electrical connector 101 cooperated with the socket core 2.3 by splicing.

The socket core 2.3 is connected to an electrical device through a wire led out from the socket 2. Preferably, the socket core 2.3 is made of a high-conductivity anti-corrosion material such as nickel plated copper. The electrical connector 101 is a banana connector. The banana connector is a common elastic electrical contact structure in an electronic device. The banana connector may be fixedly connected to the cable 100 by welding.

A pressure of the protective fluid filled in the annular cavity 4 is greater than an external atmospheric pressure. With the protective fluid in a positive pressure state in the annular cavity 4, the high-intensity insulating fluid protective layer can be maintained longer around the electrical connector 101 and the socket core 2.3, and in the annular cavity 4. This effectively lowers the internal humidity, and achieves a longer protective effect and a better insulating effect.

Figure 3:
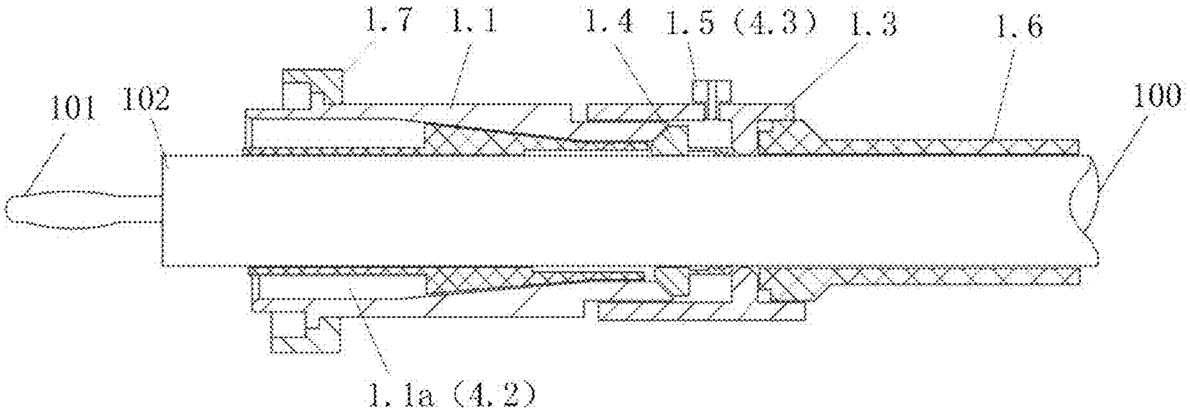
FIG. 3 is a sectional view of a plug shown in FIG. 1.

As shown in FIG. 3, inlet 4.3 for charging the protective fluid to the annular cavity 4 is formed in the plug 1. Air admission connector 1.5 is provided on the inlet 4.3. A one-way valve (not shown) is provided on the air admission connector 1.5. Outlet 4.4 communicating with the annular cavity 4 is formed in the socket 2. An overflow valve (not shown) is provided on the outlet 4.4. With the outlet 4.4, when the protective fluid is charged, original air is exhausted to ensure a purity of the protective fluid in the annular cavity 4. The one-way connection element such as the overflow valve can effectively control the pressure in the annular cavity 4.

As shown in FIG. 2, the socket 2 includes socket head 2.1 and socket body 2.2. A side of the socket body 2.2 adjacent to the plug 1 is provided with accommodation groove 2.4 for accommodating head 102 of the cable 100. The socket body 2.2 is connected to the plug 1 through the socket head 2.1. An inner diameter of the accommodation groove 2.4 is greater than a diameter of the cable 100. After inserted into the accommodation groove 2.4, the cable 100 is not in contact with an inner sidewall of the accommodation groove 2.4.

Figure 4:
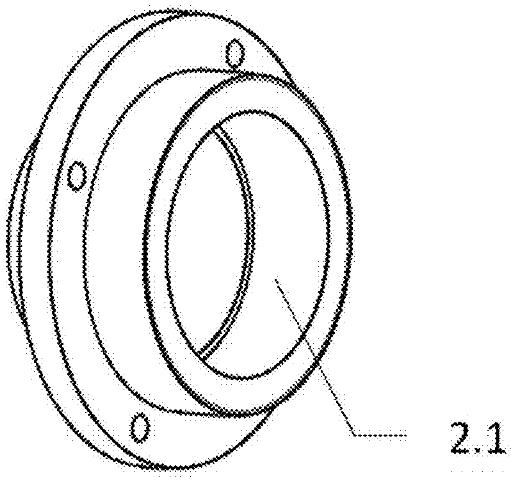
FIG. 4 is a perspective view of a socket head according to an embodiment of the present disclosure.

There are a variety of connection types between the socket head 2.1 and the socket body 2.2 that may be splicing in interference fit, threaded connection or snap-ring locking. The socket body 2.2 is made of an insulating material such as rubber, ceramic, and PPS plastic. The socket head 2.1 is made of a conductive metal material such as brass. As shown in FIG. 4, a radially outward-protruding annular connecting seat is provided on the socket head 2.1. A connecting hole or a positioning hole is formed in the annular connecting seat. The socket head 2.1 is grounded to effectively eliminate a static electricity.

Further, insertion groove 2.5 for accommodating the electrical connector 101 is formed in a bottom of the accommodation groove 2.4. The socket core 2.3 is provided in the insertion groove 2.5. More preferably, a chamfer for guiding the electrical connector 101 is provided at an edge of the insertion groove 2.5.

The annular cavity 4 includes first annular cavity 4.1 in the socket body 2.2. The first annular cavity 4.1 is sleeved outside the accommodation groove 2.4. In an axial direction of the cable 100, a bottom of the first annular cavity 4.1 protrudes from the bottom of the accommodation groove 2.4, namely the first annular cavity 4.1 completely covers the accommodation groove 2.4. An annular axial protrusion is provided between the first annular cavity 4.1 and the accommodation groove 2.4. The annular axial protrusion is sleeve-shaped, where the accommodation groove 2.4 is formed at an inner side of the annular axial protrusion, and the first annular cavity 4.1 is enclosed by an outer side of the annular axial protrusion and the socket 2.

Creepage is a slight discharge phenomenon on a surface of an insulator, and is particularly obvious at a docking position of a circuit. In the present disclosure, a connecting position between the electrical connector 101 and the socket core 2.3, and a tail end of the head 102 of the cable 100 are most likely to cause the creepage. According to the present disclosure, the first annular cavity 4.1 is formed in an outer circumference of the accommodation groove 2.4 for accommodating the head 102 of the cable 100, and the first annular cavity 4.1 as a part of the annular cavity 4 is filled with the protective fluid. The first annular cavity 4.1 effectively prevents electrons from flowing outward like a moat, thereby limiting the creepage within a small range in the socket body 2.2. The annular axial protrusion is made of an insulating material. The annular axial protrusion greatly lengthens a creepage distance, and further effectively prevents the electrons from flowing outward in combination with the first annular cavity 4.1.

Further, an outer circumference of an end of the socket body 2.2 adjacent to the socket head 2.1 is provided with annular groove **2.2*a*, or is provided with a plurality of annular grooves 2.2*a* at intervals. The annular groove 2.2*a* can effectively prevent the creepage on an outer surface of the socket body 2.2** caused by a high-voltage electric field.

Figure 6:
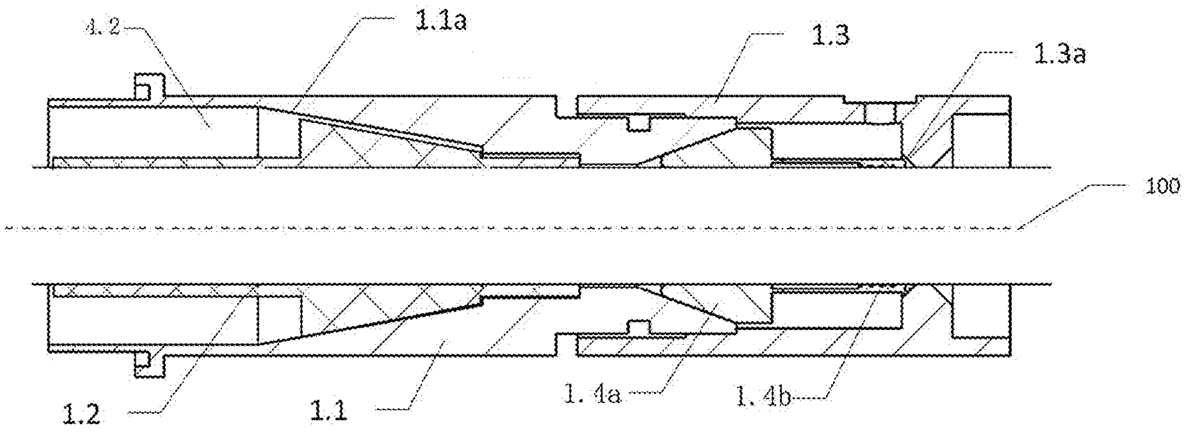
FIG. 6 is an internal structural view of a plug according to an embodiment of the present disclosure.
Figure 7:
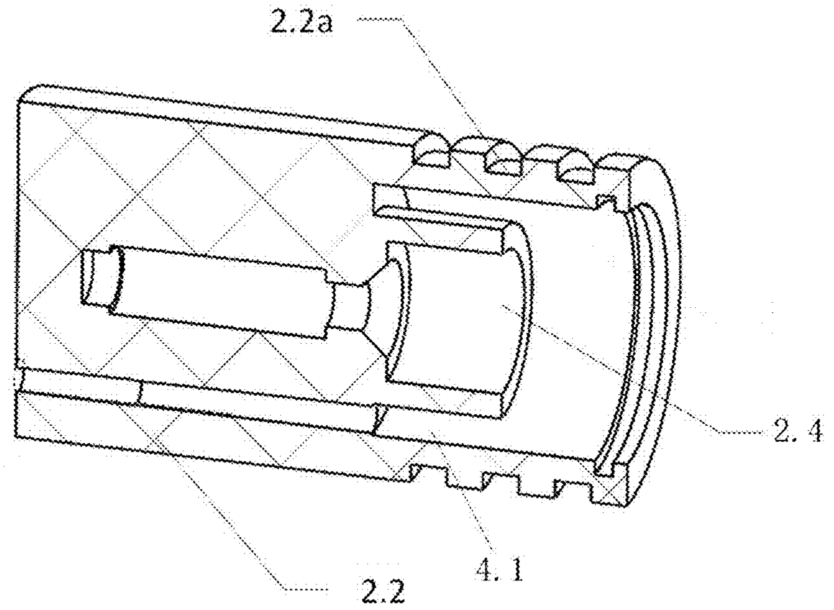
FIG. 7 is a perspective sectional view of a socket according to an embodiment of the present disclosure.

As shown in FIG. 3 and FIG. 6, the plug 1 includes plug body 1.1. Through hole **1.1*a* is formed in the plug body 1.1. An inner side of the through hole 1.1*s* is smooth, without a sharp point, so as to prevent a discharge phenomenon. A sealing structure for connecting the plug body and the socket head in a sealing manner is provided between the plug body 1.1 and the socket head 2.1**.

The cable 100 is inserted into the through hole **1.1*a* from a second end of the plug body 1.1. The head 102 of the cable 100 is stretched out of the through hole 1.1*a* from a first end of the plug body 1.1. After the first end of the plug body 1.1 is connected to the socket 2 in a sealing manner, the head 102 of the cable 100 is stretched into the accommodation groove 2.4. The electrical connector 101 is inserted into the insertion groove 2.5 and connected to the socket core 2.3. The through hole 1.1*a* naturally forms a second annular cavity 4.2 near the head 102 of the cable 100**.

Preferably, as shown in FIG. 1, the plug 1 further includes fixing nut 1.7 (or referred to as a fixing ferrule). An outer screw thread is provided on an outer circumference of the socket head 2.1. One end of the fixing nut 1.7 is provided with an inner screw thread, and the other end of the fixing nut 1.7 is provided with a radially inward-protruding annular workbench. A boss cooperated with the annular workbench is provided on the plug body 1.1. A clamping sleeve structure for docking a tube is provided between the socket head 2.1 and the fixing nut 1.7. The first end of the plug body 1.1 is inserted into a middle mounting hole of the plug head 2.1. The fixing nut 1.7 is screwed to the socket head 2.1. Through the annular workbench of the fixing nut 1.7, an outer end surface of the boss of the plug body 1.1 is attached to an end surface of the socket head 2.1, thereby realizing the sealing connection of the plug body and the socket head. A sealing washer may also be provided between the plug body 1.1 and the socket head 2.1 to achieve better sealing performance.

Figure 5:
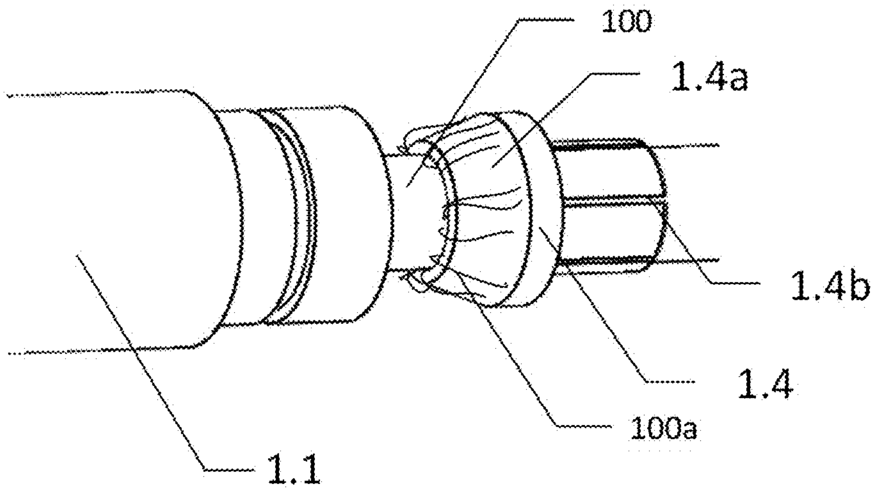
FIG. 5 is a perspective view of a cable locker according to an embodiment of the present disclosure.

In the embodiment, the quick electrical-connecting structure further includes a locking device for sealing and fixedly connecting the cable 100 and the plug body 1.1. As shown in FIG. 3 and FIG. 6, the locking device includes cable locker 1.4 and locking sleeve 1.3. A first end of the cable locker 1.4 props against the second end of the plug body 1.1. Specifically, as shown in FIG. 5, the first end of the cable locker 1.4 is provided with ring portion **1.4*a*. An outer conical surface is provided on the ring portion 1.4*a*. The second end of the plug body 1.1 is provided with an inner conical surface cooperated with the outer conical surface. A second end of the cable locker 1.4 is provided with a plurality of elastic sheets 1.4***b* arranged circumferentially at intervals. One end of the locking sleeve 1.3 is in screw-thread fit with the plug body 1.1. A sealing structure for preventing the protective fluid in the annular cavity 4 from overflowing is provided between the locking sleeve 1.3 and the plug body 1.1. The other end of the locking sleeve 1.3 is provided with wedge-shaped surface 1.3*a*. The cable 100 passes through the cable locker 1.4 and the locking sleeve 1.3 and is inserted into the plug body 1.1 through an through hole 1.1*a*. When the locking sleeve 1.3 is screwed, the elastic sheets 1.4*b* are shrunk radially through the wedge-shaped surface 1.3*a* to clasp the cable 100. Anti-slip tooth 1.4*c* for clasping the cable 100 is provided at an inner side of the elastic sheet 1.4*b*.

Further, the plug body 1.1, the locking sleeve 1.3, and the cable locker 1.4 are made of a conductive metal material, such as brass and stainless steel. More preferably, the cable locker 1.4 is made of an elastic conductive material, such as beryllium bronze.

In the embodiment, the quick electrical-connecting structure further includes shielding net 100*a* sleeved outside the cable 100. A tail end of the shielding net 100*a* (namely the end at the head 102 of the cable 100) is turned up and pressed between the plug body 1.1 and the cable locker 1.4. Specifically, as shown in FIG. 5, the tail end of the shielding net 100*a* is turned up and pressed between the outer conical surface and the inner conical surface. The shielding net 100*a* is made of a braided metal wire, with many pores. A plurality of fluid passageways for allowing the protective fluid to pass through may be formed between the outer conical surface and the inner conical surface. The socket head 2.1, the plug body 1.1, and the cable locker 1.4 are made of the conductive material. The shielding net 100*a* is pressed between the plug body 1.1 and the cable locker 1.4. When the plug head 2.1 is grounded, the shielding net 100*a* is grounded.

The locking sleeve 1.3 is provided with a radially inward-protruding annular workbench. The wedge-shaped surface 1.3*a* is provided on the annular workbench. A sealing structure (not shown), such as one sealing ring or a plurality of sealing rings, is provided between the annular workbench and the cable 100, so as to prevent the protective fluid in the annular cavity 4 from overflowing.

More preferably, the quick electrical-connecting structure further includes support sleeve 1.2 made of an insulating material. The support sleeve 1.2 is provided in the through hole 1.1*a* of the plug body 1.1, sleeved on the cable 100, and configured to prevent the cable 100 from directly contacting the plug body 1.1.

Preferably, the support sleeve 1.2 is made of a high-intensity insulating material, such as PPS, PTFE, and PEEK.

Figure 9:
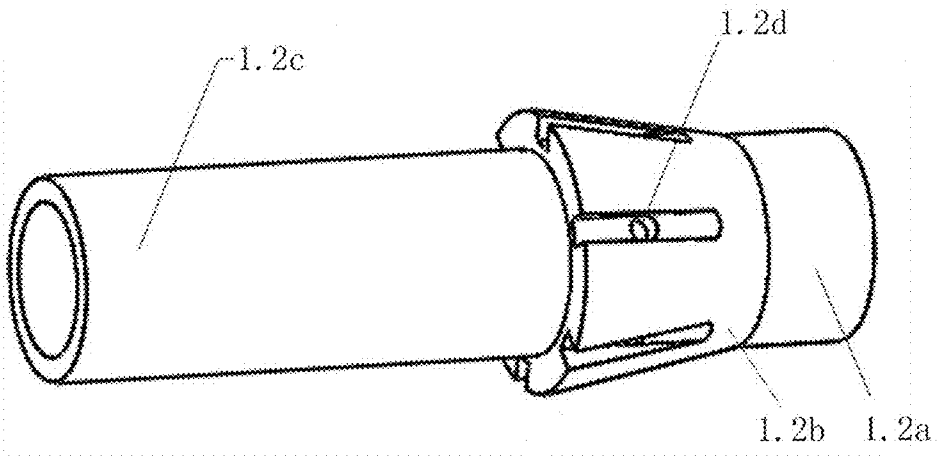
FIG. 9 is a perspective view of a support sleeve according to an embodiment of the present disclosure.
Figure 10:
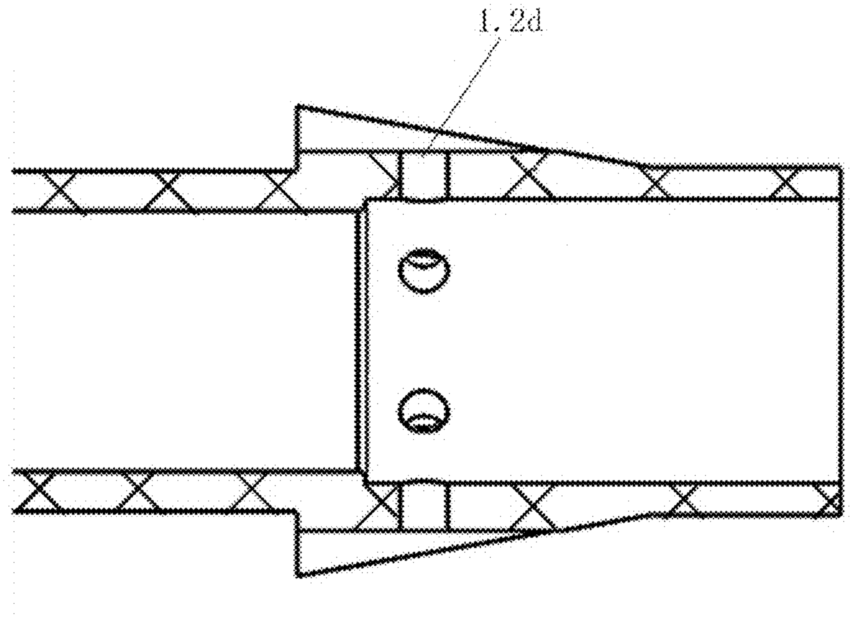
FIG. 10 is a sectional view of a support sleeve according to an embodiment of the present disclosure.

More preferably, as shown in FIG. 9 and FIG. 10, the support sleeve 1.2 sequentially includes right threaded portion 1.2*a*, middle frustum-shaped portion 1.2*b*, and left sleeve portion 1.2*c* in an axial direction. The threaded portion 1.2*a* of the support sleeve 1.2 is fixedly connected to the plug body 1.1 through threaded connection. A wall thickness of the frustum-shaped portion 1.2*b* is gradually increased from right to left, and is greater than a wall thickness of the threaded portion 1.2*a* and a wall thickness of the sleeve portion 1.2*c*. The frustum-shaped portion 1.2*b* is provided with an outer frustum-shaped surface. An inner conical surface cooperated with the outer frustum-shaped surface is provided in the through hole 1.1*a* of the plug body 1.1. In the present disclosure, the overall support sleeve 1.2 is arrow-headed. The frustum-shaped portion 1.2*b* greatly improves a supporting capacity, and prevents a portion of the cable 100 in the plug 1 and the socket 2 from directly contacting the plug 1 and the socket 2 in use. The outer frustum-shaped surface of the frustum-shaped portion 1.2*b* and the inner conical surface of the plug body 1.1 have a conicity of 6:17. The frustum-shaped portion can realize uniform transition of an electric field between a high voltage and a shielding layer in the cable 100, thereby preventing corona discharge and creepage.

An outer end of the sleeve portion 1.2*c* is flush with the first end of the plug body 1.1 or protruded from the first end of the plug body 1.1. While achieving a better support capacity, this can reserve large second annular cavity 4.2 between the sleeve portion 1.2*c* and the plug body 1.1 as much as possible, thereby improving a volume of the protective fluid. After the plug 1 and the socket 2 are docked, the first annular cavity 4.1 communicates with the second annular cavity 4.2 to form the annular cavity 4.

Figure 8:
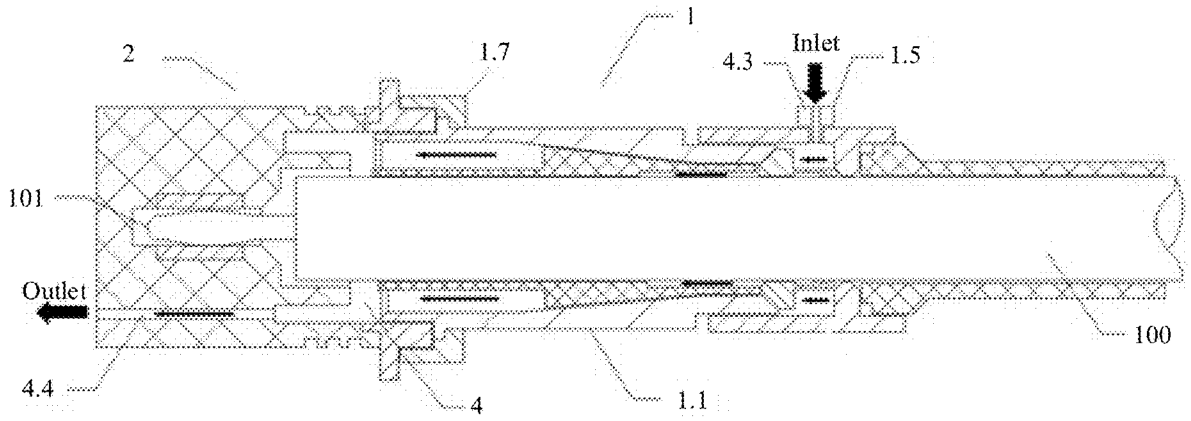
FIG. 8 is a schematic view for charging a protective fluid according to an embodiment of the present disclosure.

Inlet 4.3 is formed in the locking sleeve 1.3. Outlet 4.4 is formed in the socket body 2.2. Referring to FIG. 9 and FIG. 10, flow channel 1.2*d* for allowing the protective fluid to pass through is formed in the support sleeve 1.2. Thus, the protective fluid charged from the inlet 4.3 of the locking sleeve 1.3 flows to the annular cavity 4 through the flow channel. As shown in FIG. 8, in air inflation, the protective fluid flows to the annular cavity 4 through the inlet 4.3 and the flow channel 1.2*d*. Original air is exhausted by the outlet 4.4. Therefore, the insulating fluid protective layer is formed in the annular cavity 4. The pressure in the annular cavity 4 can be controlled or adjusted by a pressure valve or an overflow valve on the outlet 4.4.

In the embodiment, the quick electrical-connecting structure further includes anti-bending sleeve 1.6 sleeved outside the cable 100, so as to improve an anti-bending capacity of the cable 100. Preferably, the anti-bending sleeve 1.6 is fixedly connected to the locking sleeve 1.3 by clamping or threaded connection.

By charging a protective fluid to the annular cavity 4 in the plug 1 and the socket 2, a high-intensity insulating fluid protective layer is maintained around a connecting position of the cable 100 in the annular cavity 4. Therefore, the quick electrical-connecting structure for a high-voltage high-frequency pulse environment provided by the present disclosure lowers an internal humidity, and can effectively reduce corona discharge and creepage.

Finally, it should be noted that the above embodiments are merely intended to describe the technical solutions of the present disclosure, rather than to limit the present disclosure. Although the present disclosure is described in detail with reference to the above embodiments, persons of ordinary skill in the art should understand that they may still make modifications to the technical solutions described in the above embodiments or make equivalent replacements to some or all technical features thereof, without departing from the essence of the technical solutions in the embodiments of the present disclosure.

What is claimed is:

1. A quick electrical-connecting structure for a high-voltage high-frequency pulse environment, comprising a plug, a socket, and a cable, wherein the cable is connected to the socket through the plug; and the plug and the socket internally enclose an annular cavity surrounding the cable; and a protective fluid is filled in the annular cavity, wherein the socket comprises a socket head and a socket body; the socket body is connected to the plug through the socket head; and the socket head is made of a conductive material, and wherein an outer circumference of an end of the socket body adjacent to the socket head is provided with an annular groove, or is provided with a plurality of annular grooves at intervals.

2. The quick electrical-connecting structure according to claim 1, wherein an inlet for charging the protective fluid to the annular cavity is formed in the plug or the socket; and an outlet communicating with the annular cavity is formed in the socket or the plug; and an overflow valve is provided on the outlet.

3. The quick electrical-connecting structure according to claim 1, wherein a side of the socket adjacent to the plug is provided with an accommodation groove for accommodating a head of the cable; an inner diameter of the accommodation groove is greater than a diameter of the cable; and after the cable is inserted into the accommodation groove, the cable is not in contact with an inner sidewall of the accommodation groove.

4. A quick electrical-connecting structure for a high-voltage high-frequency pulse environment, comprising a plug, a socket, and a cable, wherein the cable is connected to the socket through the plug; and the plug and the socket internally enclose an annular cavity surrounding the cable; and a protective fluid is filled in the annular cavity, wherein a side of the socket adjacent to the plug is provided with an accommodation groove for accommodating a head of the cable; an inner diameter of the accommodation groove is greater than a diameter of the cable; and after the cable is inserted into the accommodation groove, the cable is not in contact with an inner sidewall of the accommodation groove, and wherein a first annular cavity is formed in the socket; the first annular cavity is sleeved outside the accommodation groove; the socket is provided with an annular axial protrusion between the first annular cavity and the accommodation groove; and the annular axial protrusion is sleeve-shaped, wherein the accommodation groove is formed at an inner side of the annular axial protrusion, and the first annular cavity is enclosed by an outer side of the annular axial protrusion and the socket.

5. The quick electrical-connecting structure according to claim 3, wherein the plug comprises a plug body; a through hole is formed in the plug body; the cable is inserted into the through hole from a second end of the plug body; the head of the cable is stretched out of the through hole from a first end of the plug body; and after the first end of the plug body is connected to the socket in a sealing manner, the head of the cable is stretched into the accommodation groove.

6. The quick electrical-connecting structure according to claim 5, wherein the plug further comprises a fixing nut; an outer screw thread is provided on an outer circumference of the socket head; and a first end of the fixing nut is provided with an inner screw thread.

7. The quick electrical-connecting structure according to claim 5, wherein an inner diameter of a first end of the through hole is greater than an inner diameter of a second end of the through hole, wherein the first end of the through hole is adjacent to the socket, and the second end of the through hole is away from the socket; and an inner surface of the through hole is in smooth transition.

8. A quick electrical-connecting structure for a high-voltage high-frequency pulse environment, comprising a plug, a socket, a cable and a locking device, wherein the cable is connected to the socket through the plug;

the plug and the socket internally enclose an annular cavity surrounding the cable, and a protective fluid is filled in the annular cavity;

wherein the plug comprises a plug body; a through hole is formed in the plug body; the cable is inserted into the through hole from a second end of the plug body; the head of the cable is stretched out of the through hole from a first end of the plug body; and after the first end of the plug body is connected to the socket in a sealing manner, the head of the cable is stretched into the accommodation groove; and the locking device is for sealing and fixedly connecting the cable and the plug body, wherein the locking device comprises a cable locker and a locking sleeve; a first end of the cable locker props against the second end of the plug body, and a second end of the cable locker is provided with a plurality of elastic sheets arranged circumferentially at intervals; a first end of the locking sleeve is in screw-thread fit with the plug body, and a second end of the locking sleeve is provided with a wedge-shaped surface; the cable passes through the cable locker and the locking sleeve; and when the locking sleeve is screwed, the plurality of elastic sheets are shrunk radially through the wedge-shaped surface to clasp the cable.

9. The quick electrical-connecting structure according to claim 8, wherein an anti-slip tooth or anti-slip pattern for clasping the cable is provided at an inner side of each of the plurality of elastic sheets.

10. The quick electrical-connecting structure according to claim 8, wherein the first end of the cable locker is provided with a ring portion; an outer conical surface is provided on the ring portion; and the second end of the plug body is provided with an inner conical surface cooperated with the outer conical surface.

11. The quick electrical-connecting structure according to claim 10, further comprising a shielding net sleeved outside the cable, wherein a tail end of the shielding net is turned up and pressed between the plug body and the cable locker.

12. The quick electrical-connecting structure according to claim 8, wherein the second end of the locking sleeve is provided with a radially inward-protruding annular table; the wedge-shaped surface is provided on the radially inward-protruding annular table; and a sealing structure is provided between the radially inward-protruding annular table and the cable.

13. The quick electrical-connecting structure according to claim 8, further comprising a support sleeve made of an insulating material, wherein the support sleeve is provided in the through hole of the plug body, sleeved on the cable, and configured to prevent the cable from directly contacting the plug body.

14. The quick electrical-connecting structure according to claim 13, wherein the support sleeve is made of a high-intensity insulating material.

15. The quick electrical-connecting structure according to claim 13, wherein the support sleeve sequentially comprises a threaded portion, a frustum-shaped portion, and a sleeve portion in an axial direction; a wall thickness of the frustum-shaped portion is greater than a wall thickness of the threaded portion and a wall thickness of the sleeve portion; the frustum-shaped portion is provided with an outer frustum-shaped surface; and an inner conical surface cooperated with the outer frustum-shaped surface is provided in the through hole of the plug body.

16. The quick electrical-connecting structure according to claim 15, wherein a flow channel for allowing the protective fluid to pass through is formed in the support sleeve.

* * * * *